US009952395B2

United States Patent
Bauco

(10) Patent No.: US 9,952,395 B2
(45) Date of Patent: Apr. 24, 2018

(54) OPTICAL FIBER CABLE WITH WRAPPED, WELDED JACKET AND METHOD OF MANUFACTURING

(71) Applicant: Corning Optical Communications LLC, Hickory, NC (US)

(72) Inventor: Anthony Sebastian Bauco, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/599,864

(22) Filed: May 19, 2017

(65) Prior Publication Data

US 2017/0343753 A1 Nov. 30, 2017

Related U.S. Application Data

(60) Provisional application No. 62/343,168, filed on May 31, 2016.

(51) Int. Cl.
*G02B 6/44* (2006.01)
*B23K 11/06* (2006.01)
*B29D 11/00* (2006.01)

(52) U.S. Cl.
CPC ......... *G02B 6/4434* (2013.01); *G02B 6/4495* (2013.01); *B23K 11/062* (2013.01); *B29D 11/0075* (2013.01); *B32B 2274/00* (2013.01)

(58) Field of Classification Search
CPC ....... G02B 6/44; G02B 6/4434; G02B 6/4495
See application file for complete search history.

(56) References Cited

U.S. PATENT DOCUMENTS

| 4,366,201 A | 12/1982 | Changani et al. |
| 4,404,010 A * | 9/1983 | Bricheno ............. G02B 6/2558 264/230 |
| 4,577,925 A | 3/1986 | Winter et al. |
| 4,765,712 A | 8/1988 | Bohannon, Jr. et al. |
| 2009/0324182 A1 | 12/2009 | Kachmar et al. |
| 2016/0085023 A1* | 3/2016 | Dowd .................. G02B 6/4488 385/100 |

OTHER PUBLICATIONS

International Search Report and Written Opinion of the International Searching Authority; PCT/US2017/033449; dated Aug. 1, 2017; 9 Pages; US Commissioner for Patents.

* cited by examiner

*Primary Examiner* — Sung Pak
*Assistant Examiner* — Hoang Tran
(74) *Attorney, Agent, or Firm* — William D. Doyle

(57) ABSTRACT

An optical cable and method for forming an optical cable is provided. The cable includes a cable jacket including an inner surface defining a channel and an outer surface and also includes a plurality of optical fibers located within the channel. The cable includes a seam within the cable jacket that couples together opposing longitudinal edges of a wrapped thermoplastic sheet which forms the cable jacket and maintains the cable jacket in the wrapped configuration around the plurality of optical fibers. The method includes forming an outer cable jacket by wrapping a sheet of thermoplastic material around a plurality of optical core elements. The method includes melting together portions of thermoplastic material of opposing longitudinal edges of the wrapped sheet such that a seam is formed holding the sheet of thermoplastic material in the wrapped configuration around the core elements.

15 Claims, 3 Drawing Sheets

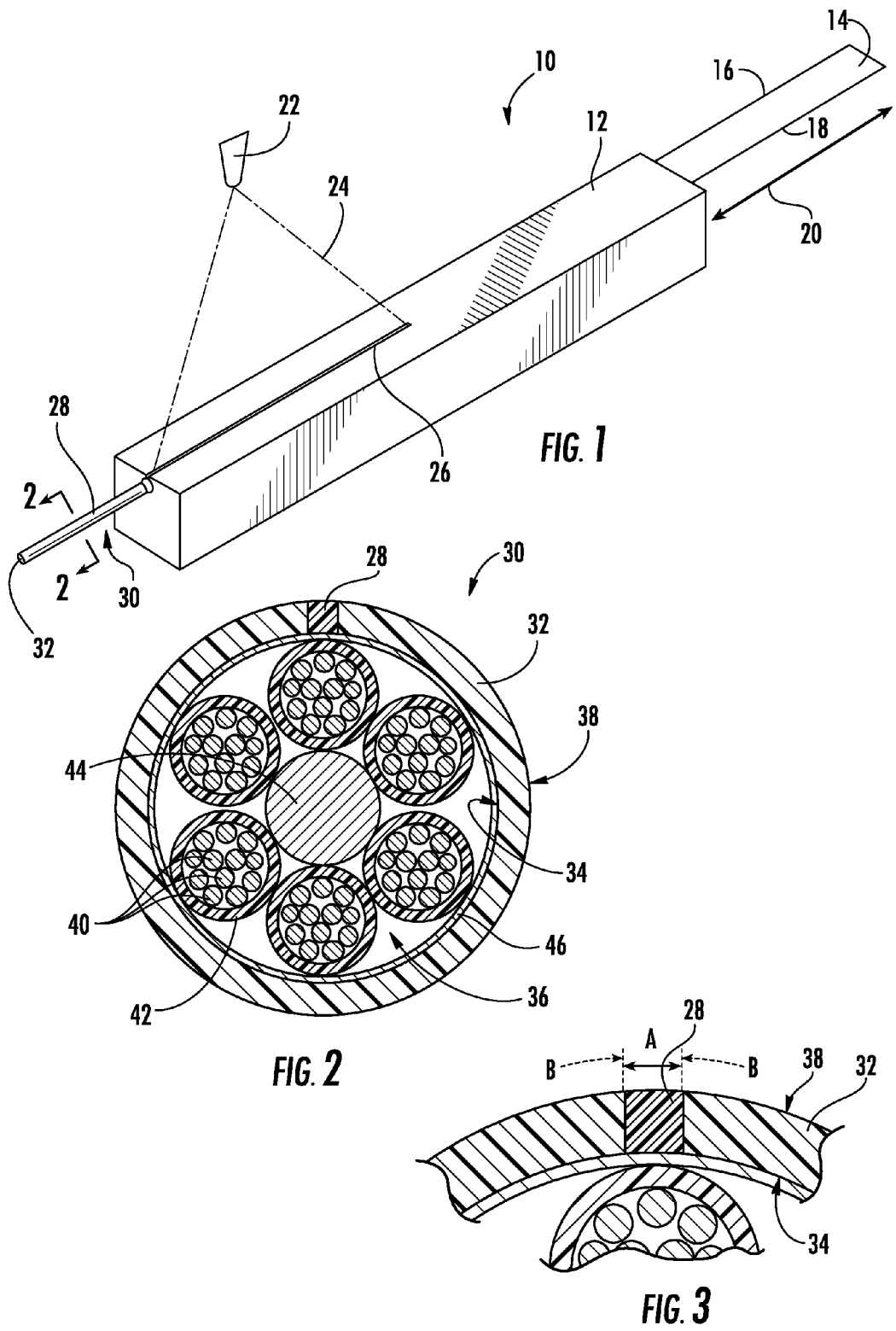

OPTICAL FIBER CABLE WITH WRAPPED, WELDED JACKET AND METHOD OF MANUFACTURING

CROSS-REFERENCE TO RELATED APPLICATIONS

This application claims the benefit of priority under 35 U.S.C. § 119 to U.S. Provisional Application No. 62/343,168, filed on May 31, 2016, and is incorporated herein by reference.

BACKGROUND

The disclosure relates generally to cables and more particularly to fiber optic cables having a wrapped and welded cable jacket. Optical cables have seen increased use in a wide variety of fields including various electronics and telecommunications fields. Optical cables contain or surround one or more optical fibers. The cable provides structure and protection for the optical fibers within the cable.

SUMMARY

One embodiment of the disclosure relates to an optical cable. The optical cable includes a plurality of optical fibers and an outer jacket. The outer jacket includes a sheet of thermoplastic material wrapped around the plurality of optical fibers such that the optical fibers are surrounded by the wrapped sheet of thermoplastic material. The outer jacket includes an outer surface of the wrapped sheet of thermoplastic material that defines the outermost surface of the cable. The cable includes a welded seam coupling together opposing longitudinal edges of the wrapped thermoplastic sheet and maintaining the outer jacket in the wrapped configuration around the plurality of optical fibers. The welded seam is formed from portions of the wrapped sheet of thermoplastic material at the opposing longitudinal edges melted together.

An additional embodiment of the disclosure relates to an optical cable. The optical cable includes a cable jacket having an inner surface defining a channel and an outer surface. The optical cable includes a plurality of optical transmission elements located within the channel and a seam extending longitudinally within the cable jacket. The seam couples together opposing longitudinal edges of a wrapped polymer sheet which forms the cable jacket and maintains the cable jacket in the wrapped configuration around the plurality of optical transmission elements.

An additional embodiment of the disclosure relates to an method of forming an optical cable. The method includes forming a cable jacket by wrapping a sheet of thermoplastic material around a plurality of optical core elements such that opposing longitudinal edges of the wrapped sheet either contact each other or overlap each other. The method includes melting together portions of thermoplastic material of the opposing longitudinal edges of the wrapped sheet such that a seam is formed holding the sheet of thermoplastic material in the wrapped configuration around the core element.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 shows a system for forming a wrapped and welded outer cable jacket according to an exemplary embodiment.

FIG. 2 is a cross-sectional view of an optical fiber cable according to an exemplary embodiment.

FIG. 3 is a detailed cross-sectional view of the optical fiber cable of FIG. 2 according to an exemplary embodiment.

DETAILED DESCRIPTION

Figure 4:
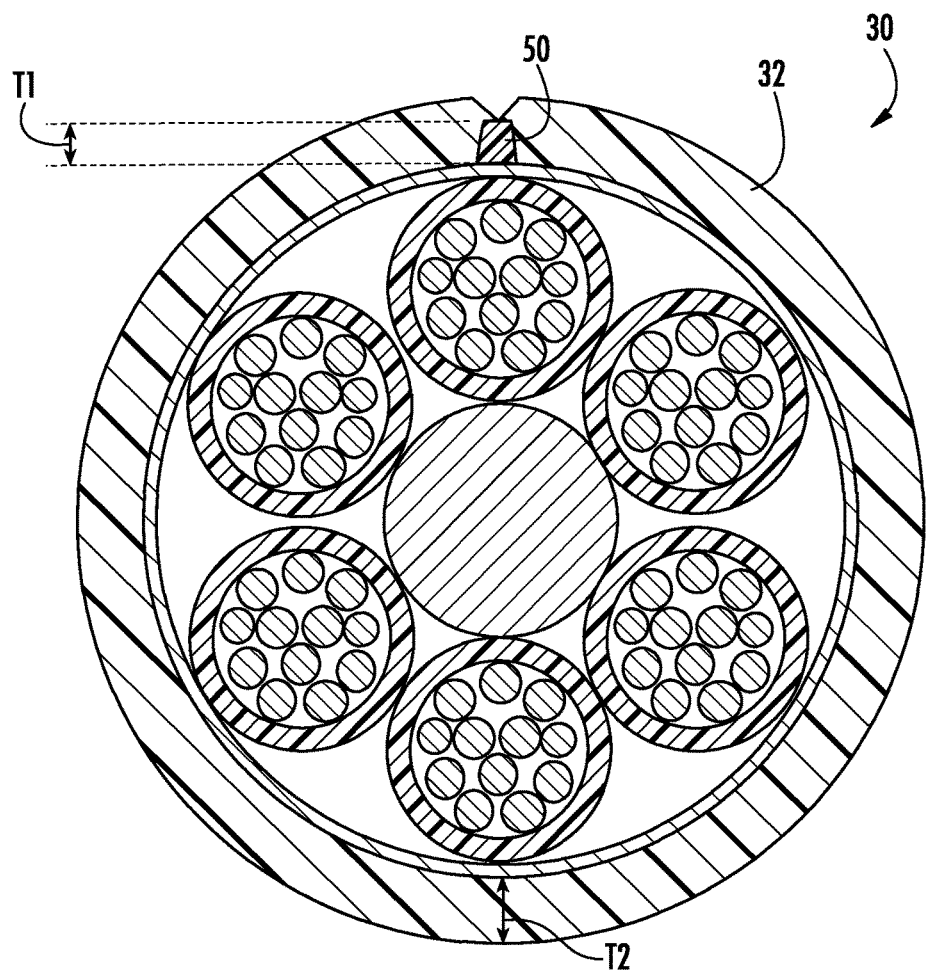
FIG. 4 is a cross-sectional view of an optical fiber cable according to another exemplary embodiment.

Referring generally to the figures, various embodiments of an optical fiber cable and methods for making an optical fiber cable are shown. In general, the cable embodiments discussed herein include a cable jacket, e.g., an outer cable jacket, formed from a pre-extruded sheet of thermoplastic material. The outer cable jacket is formed by wrapping the thermoplastic sheet around the various optical cable core components (e.g., optical fibers, buffer tubes, strength elements, water blocking materials, armor layers, binder layers, etc.), and by then forming a seam to couple together the opposing sheet edges to hold the wrapped sheet in the desired position around the core elements. In particular embodiments, the seam is formed by a welding process (e.g., a high throughput laser welding process) that melts together the opposing sheet edges such that a circumferentially contiguous outer cable jacket is formed.

In contrast to conventional processes in which the outer cable jacket is extruded around the core components inline with the other cable assembly steps, the system of the present application is believed to enable higher throughput cable assembly through high speed wrapping and seam welding. In addition, the seam formation process discussed herein provides the ability to design and select particular seam properties. For example, in some embodiments, the seam is formed in a manner such that the seam is weaker than the surrounding areas of the cable jacket allowing the seam to operate as an easy opening feature providing easy access to the cable core components.

In addition, in specific embodiments, by utilizing a pre-extruded sheet of material to form the cable jacket, the system of the present disclosure allows for the material of the cable jacket to be cross-linked (e.g., through use of an electron beam, x-ray beam, etc.). Cross-linking is believed to increase cable jacket strength and to reduce the shrinkage experienced by the cable jacket over time as compared to conventional non-cross-linked, inline extruded cable jackets. Further, it is believed that by utilizing a pre-extruded sheet for the cable jacket, the cross-linking energy source may be applied to both major surfaces of the pre-extruded sheet prior to wrapping, providing superior levels of cross-linking.

In addition, in specific embodiments, portions of the pre-extruded sheet of cable jacket material adjacent to the longitudinal opposing edges of the sheet are left uncross-linked which facilitates welded seam formation. Further, the uncross-linked portions help form a seam that is weaker than the surrounding cross-linked portions of the cable jacket, which in turn facilitates the function of the seam discussed herein as an easy opening feature within the cable jacket.

Referring to FIG. 1, a system 10 for forming a wrapped cable jacket, such as an outer cable jacket, is shown according to an exemplary embodiment. System 10 includes a forming block 12 which receives a pre-extruded sheet 14 of polymer jacket material (e.g., a thermoplastic jacket material). Sheet 14 has opposing longitudinal edges 16 and 18 and a longitudinal axis 20.

Sheet 14 is advanced into forming block 12 in the direction of longitudinal axis 20. It will be understood that all of the other cable core components that will be surrounded by the cable jacket formed from sheet 14 are also advanced into forming block 12. Within forming block 12, sheet 14 is wrapped into around the cable core components such that a generally tubular structure is formed from sheet 14 surrounding the cable core components.

System 10 includes a laser 22 that generates a laser beam 24. Laser beam 24 is directed through opening 26 in forming block 12 toward the material of the opposing edges 16 and 18 of sheet 14 such that laser beam 24 interacts with wrapped sheet 14. Specifically, laser beam 24 melts the thermoplastic material of the portions of sheet 14 adjacent the longitudinal edges 16 and 18 together such that a seam, shown as welded seam 28, is formed. In other embodiments, other suitable devices for melt forming seam 28 may be used such as resistive heating elements, contact heating elements, etc. It is believed that in at least some embodiments, utilizing a high speed, high throughput laser device 22 may allow for formation of seam 28 and the associated cable at higher speeds than typically achieved with conventional inline jacket extrusion processes.

As shown in FIG. 1, seam 28 extends in the direction of longitudinal axis 20, and seam 28 couples together the sections of sheet 14 adjacent longitudinal edges 16 and 18 such that sheet 14 is maintained in the wrapped shaped. In various embodiments, seam 28 extends all or substantially all of the longitudinal length of cable 30, and in specific embodiments, the longitudinal length of seam 28 is greater than 10 cm, greater than 1 m, greater than 10 m, greater than 100 m, etc. In some embodiments, seam 28 is formed by bringing opposing longitudinal edges 16 and 18 together in abutting contact and then melting them together with laser beam 24. In other embodiments, a portion of sheet 14 adjacent one of the edges 16 and 18 overlaps the other opposing edge forming an overlap section, and the overlapped portions of sheet 14 are melted together forming seam 28.

In various embodiments, sheet 14 is formed from a pre-extruded sheet of thermoplastic material. In various embodiments, sheet 14 may be a variety of materials used in cable manufacturing such as polyethylene, medium density polyethylene, polyvinyl chloride (PVC), polyvinylidene difluoride (PVDF), nylon, polyester or polycarbonate and their copolymers. In addition, the material of sheet 14 may include small quantities of other materials or fillers that provide different properties to the material of sheet 14. For example, sheet 14 may include materials that provide for coloring, UV/light blocking (e.g., carbon black), burn resistance, etc.

Following formation of seam 28, optical cable 30 exits the forming block 12 having a wrapped, tubular outer cable jacket 32 surrounding the cable core elements. Referring to FIG. 2, a cross-sectional view of an optical cable 30 including a wrapped cable jacket, such as outer cable jacket 32, is shown according to an exemplary embodiment. Outer cable jacket 32 has an inner surface 34 that defines an inner passage or cavity, shown as central bore 36, and an outer surface 38 that generally defines the outermost surface of cable 30. As will be generally understood, inner surface 34 of jacket 32 defines an internal area or region within which the various cable components discussed herein are located, and jacket 32 is held in the wrapped configuration shown in FIG. 2 by the welded seam 28 joining together the opposing edges of the wrapped sheet 14. Further, while FIG. 2 shows an outer cable jacket 32 formed from sheet 14, sheet 14 can be wrapped and welded to form a variety of other thermoplastic cable layers, such as inner cable jackets, thermoplastic binding layers, etc. Applicant believes that by utilizing a pre-extruded sheet 14 (as opposed to extruding the jacket material around cable components) a higher throughput and/or lower cost process for forming an optical cable is provided.

Cable 30 includes one or more optical transmission elements or optical waveguides, shown as optical fibers 40. In the embodiment shown, groups of optical fibers 40 are located in a plurality of buffer tubes 42, and buffer tubes 42 are wrapped (e.g., in an SZ stranding pattern) around a central strength member 44. Central strength member 44 may be any suitable axial strength member, such as a glass-reinforced plastic rod, steel rod/wire, etc. Generally, cable 30 provides structure and protection to optical fibers 40 during and after installation (e.g., protection during handling, protection from elements, protection from the environment, protection from vermin, etc.). In other embodiments, the optical fibers of cable 30 are any optical fiber transmission arrangement, including tight buffered optical fibers, optical fiber ribbons, optical fiber ribbon stacks, etc.

In various embodiments, cable 30 also includes an armor layer, shown as armor 46. In general, armor 46 is formed from a strip of metal material (e.g., a metal tape, a flat elongate continuous piece of material, etc.) that is wrapped around and circumferentially surrounds buffer tubes 42. As shown in FIG. 2, armor 46 is located adjacent to the inner surface of outer jacket 32 such that these two layers are in contact with each other. In specific embodiments, armor 46 is corrugated steel tape material that is wrapped around the interior portions of cable 30, and in some such embodiments, armor 46 is longitudinally folded forming a longitudinal overlapped section where opposing edges of the tape overlap to completely surround buffer tubes 42 (and any other interior component of cable 30). In other embodiments, armor 46 may be a strip of metal tape material, helically wrapped around buffer tubes 42 such that armor 46 forms a layer circumferentially surrounding buffer tubes 42. In general, armor layer 46 provides an additional layer of protection to fibers 40 within cable 30, and may provide resistance against damage (e.g., damage caused by contact or compression during installation, damage from the elements, damage from rodents, etc.). Cable 30 may include a variety of other components or layers, such as helically wrapped binders, circumferential constrictive thin-film binders, water blocking tape materials, water-blocking fiber materials, etc.

Referring to FIG. 3, seam 28 is shown in more detail. As shown in FIG. 3, seam 28 is a melt welded seam that extends the entire thickness of jacket 32 in the radial direction. In such embodiments, seam 28 extends from inner surface 34 to outer surface 38. Further, seam 28 has an arc length shown as length A, and the portion of jacket 32 outside of seam 28 has an arc length shown as B. As will be understood, arc lengths A and B together total 360 degrees. In particular embodiments, length A is a relatively small portion of the total circumference of jacket 32. In particular embodiments, length A is less than 40 degrees, specifically less than 20 degrees, more specifically less than 10 degrees and even more specifically less than 5 degrees. In various embodiments, the length B outside of seam 28 is greater than 270 degrees, specifically greater than 300 degrees, more specifically is greater than 330 degrees, and even more specifically is greater than 350 degrees.

In particular embodiments, seam 28 acts both as the coupling mechanism maintaining jacket 32 in the wrapped configuration as well as an easy opening structure within jacket 32. As will be understood, in at least some optical cable installations, jacket 32 is opened by a user to access optical fibers 40 within jacket 32, and in many conventional cable designs additional easy opening structures, such as ripcords, are located in the cable jacket to facilitate opening. In particular embodiments, rather than utilizing additional easy opening structures alone, seam 28 acts as an easy opening feature within cable jacket 32 alone or in combination with other structures such as ripcords.

In such embodiments, seam 28 is configured in such a way that the tear strength at seam 28 is less than the tear strength of jacket 32 outside of seam 28. This differential tear strength allows the user to open jacket 32 along seam 28 to access optical fibers 40. In specific embodiments, this opening is permitted without the use of cutting tools, and in certain embodiments, cable 30 does not include jacket embedded opening structures, such as ripcords, which further simplifies construction of cable 30.

Figure 5:
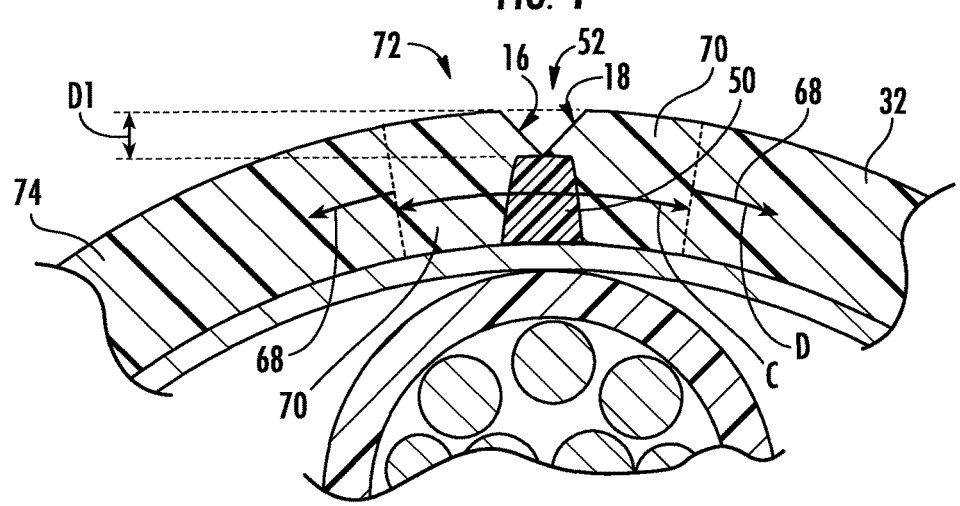
FIG. 5 is a detailed cross-sectional view of the optical fiber cable of FIG. 4 according to an exemplary embodiment.

Referring to FIG. 4 and FIG. 5, cable 30 is shown including a seam 50 according to an exemplary embodiment. Seam 50 is substantially the same as seam 28 except as discussed herein. As shown in FIG. 4 and FIG. 5, seam 50 is a melt welded seam that does not extend through the entire thickness of jacket 32 in the radial direction. In such embodiments, seam 50 has an average radial thickness shown as T1, and jacket 32 has an average radial thickness shown as T2. As shown in FIG. 4, T1 is less than T2. In specific embodiments, T1 is between 50% and 99% of T1, specifically is between 60% and 95% of T2, and more specifically is between 85% and 95% of T2. In various embodiments, the thickness T1 of seam 50 is controlled by controlling laser 22 (e.g., focusing laser 22 to different depths) during seam formation. In various embodiments, Applicant believes that the easy opening functionality provided by the welded seam arrangement discussed herein may be controlled or improved by forming a seam 50 that does not extend completely through jacket 32.

As shown in FIG. 5, a longitudinally extending surface depression, shown as notch 52, is formed at the location of seam 50. In general, notch 52 results from the outer portions of opposing edges 16 and 18 of sheet 14 that are not melted together within the structure of seam 50. In this arrangement, notch 52 is aligned in the radial direction with seam 50, and thus provides a visual or tactile indication of the location of seam 50. Further, notch 52 results in the total average thickness of jacket 32 at the location of seam 50 being less than the average thickness T2 of jacket 32, which in turn facilitates the opening of cable jacket 32 along seam 50.

As shown in FIG. 5, notch 52 has a radial depth D1. In various embodiments, D1 is between 0.1% and 50% of T2, and specifically is between %1 and 20% of T2. As can be seen in FIG. 5, in specific embodiments, the depth of notch 52, D1, and the radial thickness of seam 50, T1, added together equal the total thickness of cable jacket 32, T2.

Figure 6:
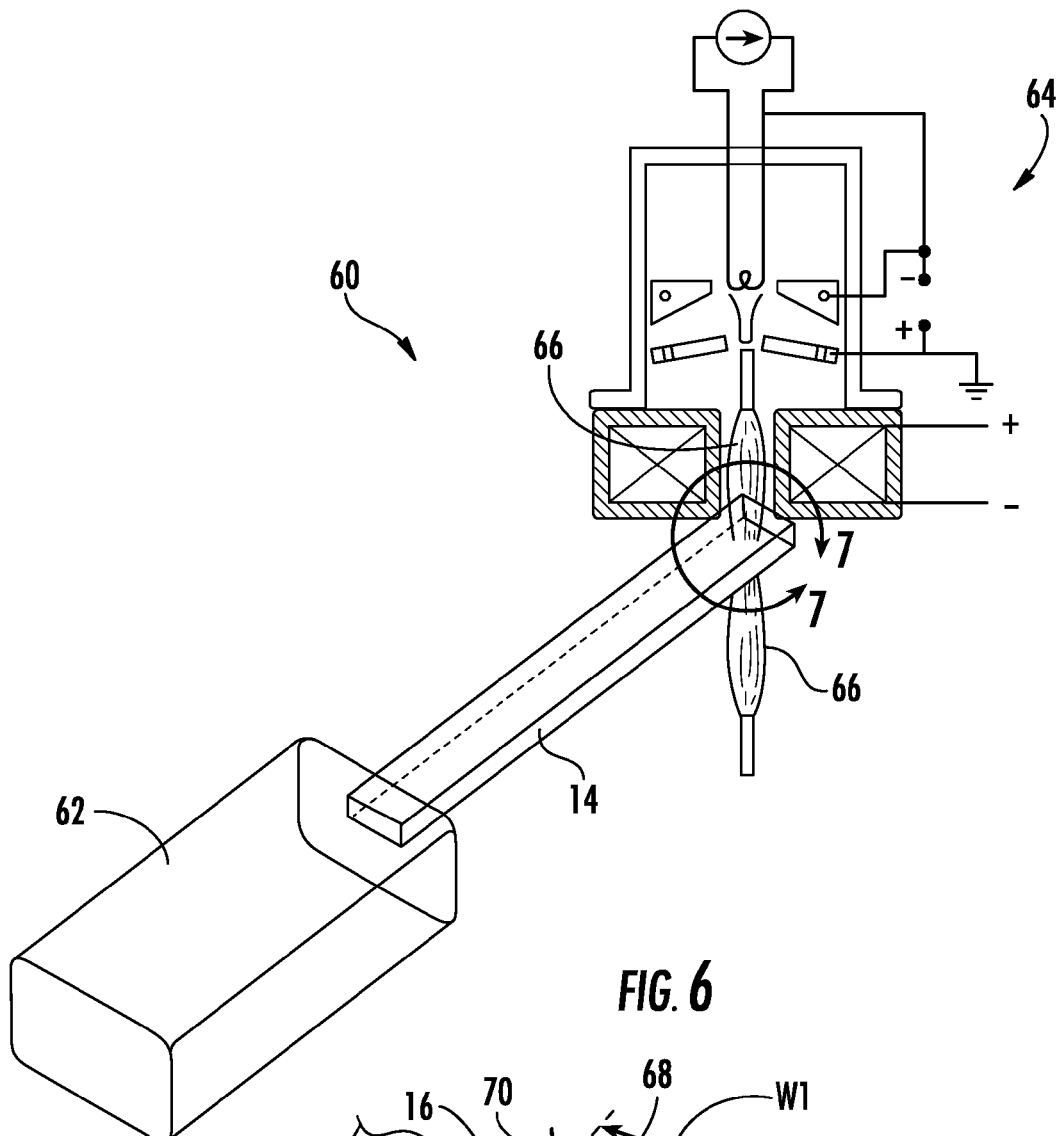
FIG. 6 shows a system for cross-linking a sheet of cable jacket material according to an exemplary embodiment.

Referring to FIG. 6, a system 60 for forming pre-extruded sheet 14 is shown according to an exemplary embodiment. As shown, system 60 includes an extruder 62 that extrudes a sheet 14 of polymer material, specifically thermoplastic material. System 60 also includes a cross-linking device, shown as electron gun 64. In general, sheet 14 is fed from extruder 62 through electron gun 64 which directs an electron beam 66 toward a portion of sheet 14.

As shown in FIG. 6, electron gun 64 is configured to direct an electron beam 66 at both major surfaces of sheet 14 (e.g., upper and lower surfaces in the orientation of FIG. 6) such that cross-linking occurs on both major surfaces of sheet 14. Thus, system 60 enables cross-linking from both sides of sheet 14 which is in contrast to a crosslinking arrangement in which crosslinking is provided after formation of the tubular cable jacket. In general, electron beam 66 causes cross-linking between the polymer molecules of sheet 14 that receive electron beam 66. By crosslinking at least a portion of the polymer material of sheet 14, the strength of the cable jacket formed from sheet 14 is improved, and the amount of shrinkage that the cable jacket will experience over time is reduced. While FIG. 6 shows a cross-linking device of system 60 as an electron gun 64, the cross-linking device of system 60 may be any suitable cross-linking device including a UV gun, an x-ray gun, a gamma radiation gun, etc.

Figure 7:
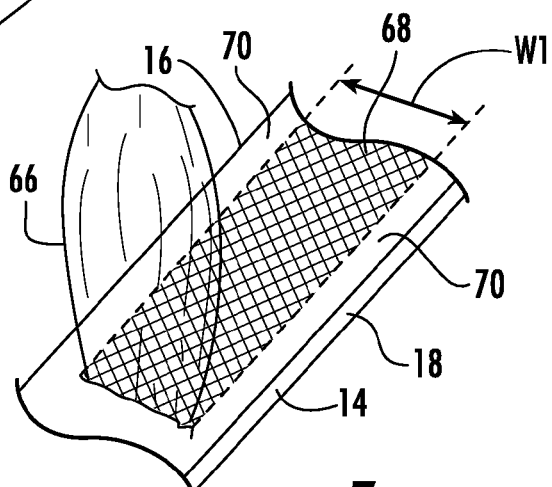
FIG. 7 is a detailed view of the cross-linked sheet of cable jacket material of FIG. 6 according to an exemplary embodiment.

As shown in FIG. 7, system 60 is configured to form a cross-linked section, shown as central cross-linked section 68. Cross-linked section 68 has a width shown as W1 that is less than the total width of sheet 14 such that uncrosslinked sections 70 are formed between longitudinal edges 16 and 18 and central cross-linked section 68. In various embodiments, W1 is between 50% and 95% of the total width of sheet 14, specifically is between 75% and 95% of the total width of sheet 14, and more specifically is between 80% and 90% of the total width of sheet 14. In various embodiments, the degree of crosslinking within section 68 is greater than the degree of crosslinking within sections 70, and the polymer material within uncrosslinked sections 70 are substantially uncrosslinked such that the degree of cross-linking within sections 70 is less than the degree of crosslinking within section 68.

Referring back to FIG. 5, in particular embodiments, seam 50 (or seam 28) is formed by melting together at least portions of the opposing uncrosslinked sections 70. Thus, when sheet 14 is wrapped and welded, the resulting cable jacket 30 has an uncrosslinked area 72 formed from uncrosslinked sections 70 of sheet 14 which surround seam 50, and jacket 32 also includes crosslinked area 74 formed from crosslinked section 68 of sheet 14 located circumferentially outside of seam 50 and the surrounding uncrosslinked area 72. In various embodiments, uncrosslinked area 72 has an arc length C, and cross-linked area 74 has an arc length D. In various embodiments, C is less than 40 degrees and D is greater than 270 degrees.

Because cross-linking generally raises the melting temperature of the thermoplastic material of sheet 14, this arrangement allows for seam 50 to be formed via melting at a lower temperature than if the entire width of sheet 14 were cross-linked, while still providing the majority of jacket 32 with the improved strength and shrinkage limitation provided by crosslinking. In addition, by excluding cross-linking and the accompanying strengthening from the region around seam 50, the easy opening functionality of seam 50 is improved by further decreasing the strength of seam 50 relative to the rest of jacket 32.

While the specific cable embodiments discussed herein and shown in the figures relate primarily to cables that have a substantially circular cross-sectional shape defining a substantially cylindrical internal bore, in other embodiments, the cables discussed herein may have any number of cross-section shapes. For example, in various embodiments, cable jacket 32 may have an oval, elliptical, square, rectangular, triangular or other cross-sectional shape. In such embodiments, the passage or lumen of the cable may be the same shape or different shape than the shape of cable jacket 32. In some embodiments, cable jacket 32 may define more than one channel or passage. In such embodiments, the multiple channels may be of the same size and shape as each other or may each have different sizes or shapes.

The optical transmission elements discussed herein include optical fibers that may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber. The optical transmission elements discussed herein can include a wide variety of optical fibers including multi-mode fibers, single mode fibers, bend insensitive/resistant fibers, etc. In other embodiments, the optical cables discussed herein may include multi-core optical fibers, and in this embodiment, each optical transmission element may be a single, integral optical structure having multiple optical transmission elements (e.g., multiple optical cores surrounded by cladding).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred. In addition, as used herein the article "a" is intended include one or more than one component or element, and is not intended to be construed as meaning only one.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical cable comprising: a plurality of optical fibers; an outer jacket comprising a sheet of thermoplastic material wrapped around the plurality of optical fibers such that the optical fibers are surrounded by the wrapped sheet of thermoplastic material and an outer surface of the wrapped sheet of thermoplastic material defines the outermost surface of the cable; and a welded seam coupling together opposing longitudinal edges of the wrapped thermoplastic sheet and maintaining the outer jacket in the wrapped configuration around the plurality of optical fibers, the welded seam formed from portions of the wrapped sheet of thermoplastic material at the opposing longitudinal edges melted together; wherein polymers of the outer jacket located outside of the welded seam are cross-linked together and polymers within the welded seam are uncrosslinked such that a degree of crosslinking within the welded seam is less than a degree of crosslinking within the portion of the outer jacket outside of the welded seam.

2. The optical cable of claim 1, wherein a thickness of the welded seam in a radial direction is less than an average thickness of the outer jacket in the radial direction, wherein the welded seam extends in a longitudinal direction along within the outer jacket.

3. The optical cable of claim 2, further comprising a longitudinally extending surface depression located along the outer surface of the wrapped sheet of thermoplastic material aligned radially with the welded seam such that the average thickness of the outer jacket at the location of the welded seam is less than the average thickness of the outer jacket.

4. The optical cable of claim 1, wherein the welded seam is formed between opposing circumferential facing edge surfaces of the wrapped sheet of thermoplastic material.

5. The optical cable of claim 1, wherein the welded seam is formed between overlapping portions of the wrapped sheet of thermoplastic material.

6. The optical cable of claim 1, wherein a tear strength at the welded seam is less than the tear strength of the outer jacket within the cross-linked portion.

7. The optical cable of claim 1, wherein a circumferential arc length of the welded seam is less than 40 degrees and a circumferential arc length of a portion of the cable jacket including cross-linked polymers is greater than 270 degrees.

8. The optical cable of claim 1, further comprising:
   a central strength member; and
   a plurality of buffer tubes wrapped around the central strength member, each buffer tube surrounding at least one of the plurality of optical fibers;
   wherein the outer jacket surrounds both the central strength member and the plurality of buffer tubes;
   wherein the thermoplastic material of the outer jacket is at least one of a polyethylene material or a polyvinylchloride material.

9. An optical cable comprising: a cable jacket including an inner surface defining a channel and an outer surface; a plurality of optical transmission elements located within the channel; and a seam extending longitudinally within the cable jacket, wherein the seam couples together opposing longitudinal edges of a wrapped polymer sheet which forms the cable jacket and maintains the cable jacket in the wrapped configuration around the plurality of optical transmission elements; wherein the polymer sheet is a thermoplastic material and the seam is a welded seam formed from portions of the wrapped polymer sheet adjacent to the opposing longitudinal edges being melted together; wherein polymers within a portion of the cable jacket located outside of the seam are cross-linked together and polymers within the seam are substantially uncrosslinked such that a degree of crosslinking within the seam is less than a degree of crosslinking within the portion of the cable jacket outside of the seam.

10. The optical cable of claim 9, wherein the cable jacket is an outer cable jacket, and the outer surface of the cable jacket is the outermost surface of the cable, wherein the seam has a longitudinal length of at least 10 cm.

11. The optical cable of claim 10, further comprising a surface depression extending longitudinally along the outer surface of the outer cable jacket, the surface depression aligned radially with the seam such that an average thickness of the outer jacket at the location of the seam is less than an average thickness of the outer jacket.

12. The optical cable of claim 9, wherein a circumferential arc length of the seam is less than 40 degrees and a circumferential arc length of the cross-linked portion is greater than 270 degrees.

13. A method of forming an optical cable comprising: forming a cable jacket by wrapping a sheet of thermoplastic material around a plurality of optical core elements such that opposing longitudinal edges of the wrapped sheet either contact each other or overlap each other; and melting together portions of thermoplastic material of the opposing longitudinal edges of the wrapped sheet such that a seam is formed holding the sheet of thermoplastic material in the wrapped configuration around the core element; forming a cross-linked section within the sheet of thermoplastic material by directing an energy beam at an upper and lower surface of the sheet of thermoplastic material prior to wrapping; wherein the cross-linked section extends in a longitudinal direction of the sheet of thermoplastic material, wherein the cross-linked section has a width perpendicular to the longitudinal direction and the sheet of thermoplastic material has a width perpendicular to the longitudinal direction, wherein the width of the cross-linked section is between 50% and 95% of the width of the sheet of thermoplastic material such that a longitudinally extending non-crosslinked section is located between the crosslinked section and each of the longitudinal edges of the sheet of thermoplastic material.

14. The method of claim 13, wherein melting comprises directing a laser beam toward the opposing longitudinal edges of the wrapped sheet of thermoplastic material such that the thermoplastic material at the opposing longitudinal edges melts together forming the seam.

15. The method of claim 13, wherein the portions of thermoplastic material melted together to form the seam are the non-crosslinked sections.

* * * * *